US011386654B2

(12) United States Patent
Soryal et al.

(10) Patent No.: US 11,386,654 B2
(45) Date of Patent: Jul. 12, 2022

(54) METHOD AND APPARATUS FOR GENERATING VIRTUAL OBJECTS

(71) Applicant: AT&T Intellectual Property I, L.P., Atlanta, GA (US)

(72) Inventors: Joseph Soryal, Ridgewood, NY (US); Naila Jaoude, Eatontown, NJ (US); Samuel N. Zellner, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/174,379

(22) Filed: Feb. 12, 2021

(65) Prior Publication Data

US 2021/0166032 A1 Jun. 3, 2021

Related U.S. Application Data

(63) Continuation of application No. 16/455,875, filed on Jun. 28, 2019, now Pat. No. 10,956,742.

(51) Int. Cl.
*G06V 20/20* (2022.01)
*G06T 19/00* (2011.01)
*G06T 7/70* (2017.01)
*G06N 20/10* (2019.01)
*G06K 9/62* (2022.01)
*G03H 1/00* (2006.01)

(52) U.S. Cl.
CPC ........... *G06V 20/20* (2022.01); *G03H 1/0005* (2013.01); *G06K 9/6289* (2013.01); *G06N 20/10* (2019.01); *G06T 7/70* (2017.01); *G06T 19/006* (2013.01); *G03H 2001/0061* (2013.01)

(58) Field of Classification Search
CPC .................................. G06T 7/70; G06V 20/20
See application file for complete search history.

(56) References Cited

U.S. PATENT DOCUMENTS

2013/0222371 A1\* 8/2013 Reitan .................... G09G 3/003
345/419
2014/0192087 A1\* 7/2014 Frost ..................... G06F 3/0325
345/633

(Continued)

OTHER PUBLICATIONS

"Feeling objects that aren't there", Science News for Students, https://www.sciencenewsforstudents.org/article/feeling-objects-arent-there, Apr. 14, 2016, 16.

(Continued)

*Primary Examiner* — Shivang I Patel
(74) *Attorney, Agent, or Firm* — Guntin & Gust, PLC

(57) ABSTRACT

Aspects of the subject disclosure may include, for example, obtaining a first request for a first virtual object, obtaining first data regarding the first virtual object responsive to the obtaining of the first request, analyzing the first data to identify a first plurality of characteristics for the first virtual object, wherein the first plurality of characteristics include a first visual aspect of the first virtual object, a first auditory aspect of the first virtual object, a first scent aspect of the first virtual object, and a first haptic aspect of the first virtual object, and responsive to the analyzing of the first data, enabling at least a first sensory unit of a plurality of sensory units to render the first virtual object in accordance with the first plurality of characteristics. Other embodiments are disclosed.

20 Claims, 8 Drawing Sheets

(56) References Cited

U.S. PATENT DOCUMENTS

2014/0285328 A1   9/2014   Chung et al.
2017/0021273 A1   1/2017   Rios
2020/0410237 A1   12/2020  Soryal et al.

OTHER PUBLICATIONS

"Inside a Real Life Holodeck", The Good Stuff, https://www.youtube.com/watch?v=L4gBCtfqZtU, Jun. 9, 2017.

"Introducing the Real-Life Holodeck", Youtube, https://youtube.com/watch?v=cYPauVa1jLg, Mar. 17, 2015, 1.

"Scientists Create Holograms that you can Touch", https://iflscience.com/technology/scientists-create-holograms-you-can-touch/, May 10, 2019, 5 pp.

"What You Need to Know About Touchable Holograms", https://thegadgetflow.com/blog/need-know-touchable-holograms/, May 10, 2019, 5 pp.

"X Reality (XR)", Wikipedia, https://en.wikipedia.org/wiki/X_Reality_(XR), Aug. 30, 2018.

Balladares, Alex, "Understanding Haptics for VR", Virtual Reality Pop, https://virtualrealitypop.com/understanding-haptics-for-vr-2844ed2a1b2f, Apr. 5, 2019, 7.

Hutson, Matthew, "Reaching out to touch virtual reality", knowable Magazine from Annual Reviews, https://www.knowablemagazine.org/article/technology/2018/reaching-out-touch-virtual-reality, Dec. 20, 2018, 9.

Loffhagen, Matthew, "Nvidia Has Built a Real-Life Virtual Reality Holodeck", https://www.outerplaces.com/science/item/16870-nvidia-holodeck-virtual-reality, Oct. 10, 2017, 2.

Ochiai, Yoichi et al., "Fairy Lights in Femtoseconds: Aerial and Volumetric Graphic Rendered by Focused Femtosecond Laser Combined with Computational Holographic Fields", CAS/CAM System, 1979.

Ulrich-Verderber, Liesl, "Take a Walk in a Real Life Holodeck", Ever Widening Circles, https://everwideningcircles.com, Apr. 22, 2019, 9.

\* cited by examiner

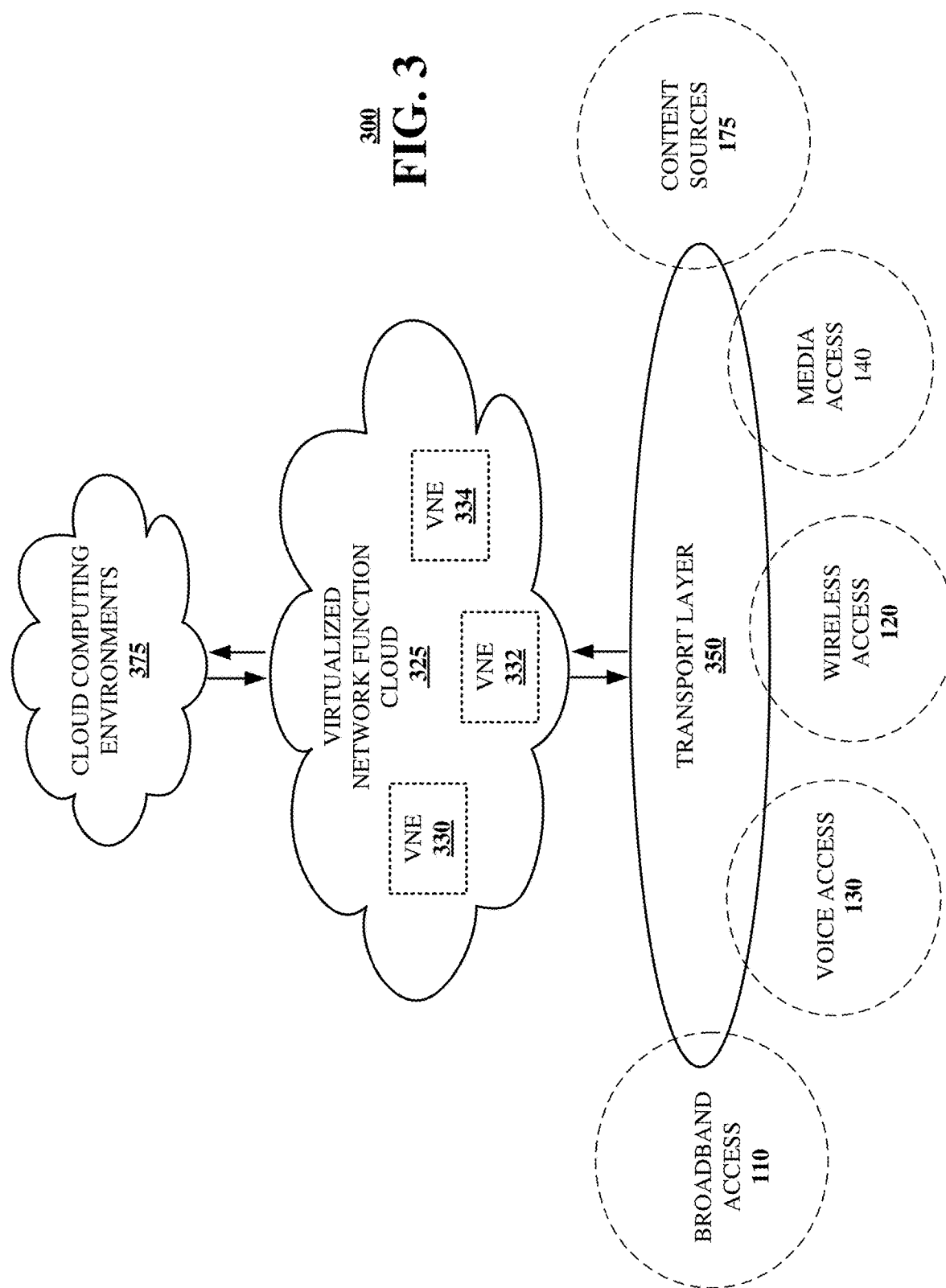

METHOD AND APPARATUS FOR GENERATING VIRTUAL OBJECTS

CROSS REFERENCE TO RELATED APPLICATIONS

This application is a continuation of U.S. patent application Ser. No. 16/455,875 filed on Jun. 28, 2019. All sections of the aforementioned application are incorporated herein by reference in their entirety.

FIELD OF THE DISCLOSURE

The subject disclosure relates to a method and apparatus for generating virtual objects.

BACKGROUND

As the world continues to become increasingly connected over vast communications networks, opportunities exist for enhancing or augmenting an environment where people or users of devices are located. For example, X reality (XR) (also referred to as cross reality) is a form of a mixed reality (MR) environment that is a result of a fusion/union of ubiquitous sensors/actuator networks and shared online virtual worlds. XR technology enables content creation, generation, and provisioning for virtual reality (VR), augmented reality (AR), and cinematic reality (CR) environments. For example, XR technology is used to generate new or alternative forms of reality by incorporating virtual objects (e.g., holograms) into the physical world and incorporating physical objects in a virtual (e.g., digital) world. In this respect, XR technology incorporates aspects of a MR, where traditional dividing lines between the physical world and the virtual world are blended, obscured, or even eliminated.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
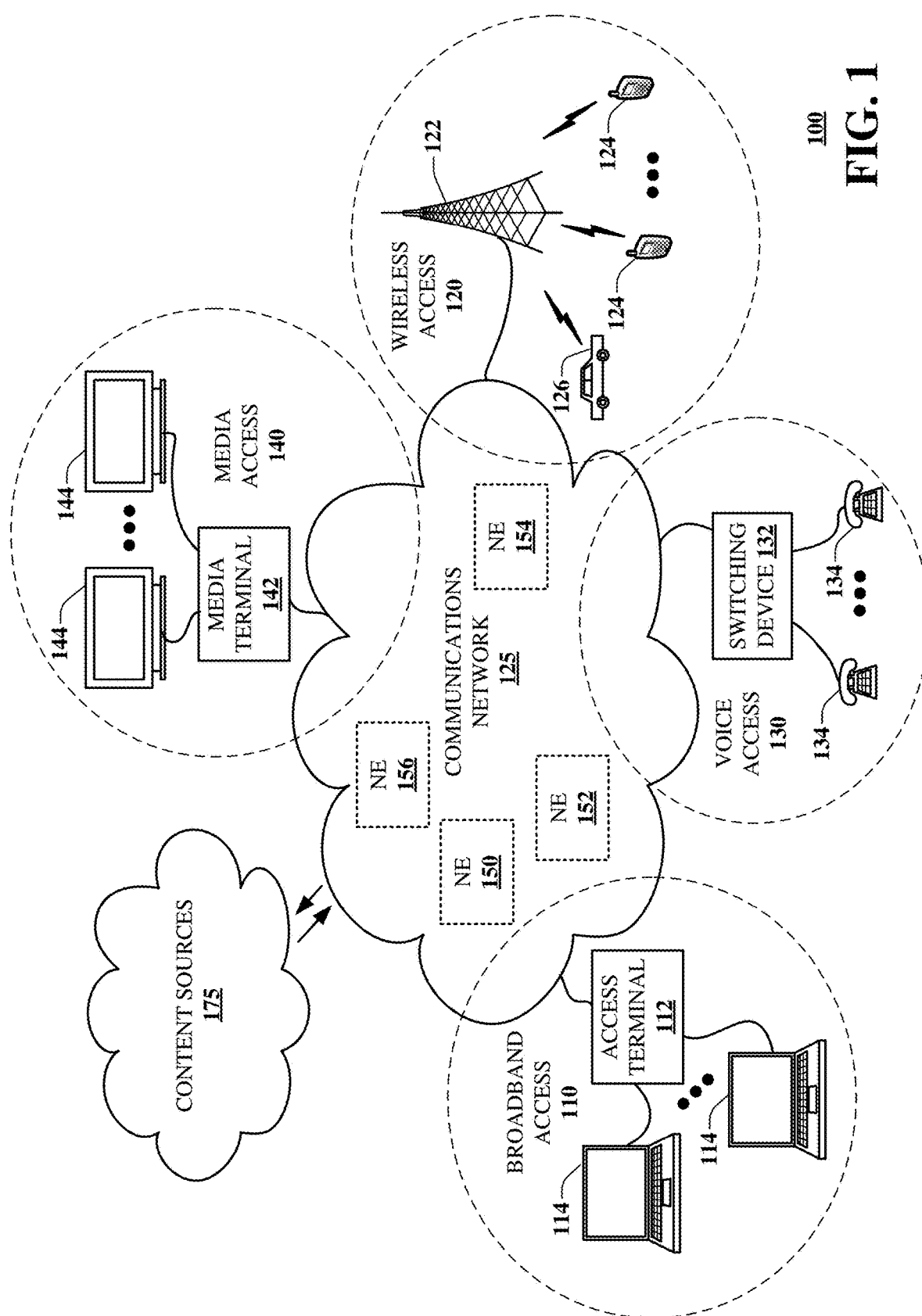
FIG. 1 is a block diagram illustrating an exemplary, non-limiting embodiment of a communications network in accordance with various aspects described herein.

The subject disclosure describes, among other things, illustrative embodiments for generating one or more virtual objects in accordance with one or more characteristics for the virtual objects. Other embodiments are described in the subject disclosure.

One or more aspects of the subject disclosure include analyzing first data regarding a first virtual object to identify a first plurality of characteristics for the first virtual object, wherein the first plurality of characteristics includes at least two characteristics from a group of characteristics, and wherein the group of characteristics includes a first visual aspect of the first virtual object, a first auditory aspect of the first virtual object, a first scent aspect of the first virtual object, and a first haptic aspect of the first virtual object, and responsive to the analyzing of the first data, enabling at least a first sensory unit of a plurality of sensory units to render the first virtual object in accordance with the first plurality of characteristics.

One or more aspects of the subject disclosure include obtaining a first specification regarding a first virtual object via a first network, receiving a first request from a first communications device for the first virtual object, responsive to the receiving of the first request for the first virtual object, analyzing the first specification to identify a first plurality of characteristics for the first virtual object, rendering the first virtual object within a threshold distance of the first communications device in accordance with the first plurality of characteristics, wherein the rendering occurs via a second network, and subsequent to the rendering of the first virtual object, obtaining at least one input that causes a modification to the rendering of the first virtual object resulting in a second plurality of characteristics for the first virtual object, wherein the second plurality of characteristics are at least partially differentiated from the first plurality of characteristics.

One or more aspects of the subject disclosure include identifying at least a first characteristic associated with a first virtual object in accordance with first data associated with the first virtual object, wherein the at least a first characteristic comprises a first visual aspect of the first virtual object, a first auditory aspect of the first virtual object, a first scent aspect of the first virtual object, a first haptic aspect of the first virtual object, or any combination thereof, responsive to the identifying, rendering the first virtual object in accordance with the at least a first characteristic, obtaining at least a first input that is directed to a first modification of a second characteristic of the first virtual object, the obtaining of the at least a first input resulting in a first modified characteristic of the first virtual object, responsive to the obtaining of the at least a first input, modifying the first data in accordance with the first modified characteristic of the first virtual object, the modifying resulting in second data, and responsive to the modifying, storing the second data such that subsequent to the storing the first virtual object is rendered according to the first modified characteristic.

Referring now to FIG. 1, a block diagram is shown illustrating an example, non-limiting embodiment of a communications network 100 in accordance with various aspects described herein. For example, communications network 100 can facilitate in whole or in part obtaining a first request for a first virtual object, obtaining first data regarding the first virtual object responsive to the obtaining of the first request, analyzing the first data to identify a first plurality of characteristics for the first virtual object, wherein the first plurality of characteristics include a first visual aspect of the first virtual object, a first auditory aspect of the first virtual object, a first scent aspect of the first virtual object, and a first haptic aspect of the first virtual object, and responsive to the analyzing of the first data, enabling at least a first sensory unit of a plurality of sensory units to render the first virtual object in accordance with the first plurality of characteristics. Communications network 100 can facilitate in whole or in part obtaining a first specification regarding a first virtual object via a first network, receiving a first request from a first communications device for the first virtual object, responsive to the receiving of the first request for the first virtual object, analyzing the first specification to identify a first plurality of characteristics for the first virtual object, rendering the first virtual object within a threshold distance of the first communications device in accordance with the first plurality of characteristics, wherein the rendering occurs via a second network, and subsequent to the rendering of the first virtual object, obtaining at least one input that causes a modification to the rendering of the first virtual object resulting in a second plurality of characteristics for the first virtual object, wherein the second plurality of characteristics are at least partially differentiated from the first plurality of characteristics. Communications network 100 can facilitate in whole or in part identifying at least a first characteristic associated with a first virtual object in accordance with first data associated with the first virtual object, wherein the at least a first characteristic comprises a first visual aspect of the first virtual object, a first auditory aspect of the first virtual object, a first scent aspect of the first virtual object, a first haptic aspect of the first virtual object, or any combination thereof, responsive to the identifying, rendering the first virtual object in accordance with the at least a first characteristic, obtaining at least a first input that is directed to a first modification of a second characteristic of the first virtual object, the obtaining of the at least a first input resulting in a first modified characteristic of the first virtual object, responsive to the obtaining of the at least a first input, modifying the first data in accordance with the first modified characteristic of the first virtual object, the modifying resulting in second data, and responsive to the modifying, storing the second data such that subsequent to the storing the first virtual object is rendered according to the first modified characteristic.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
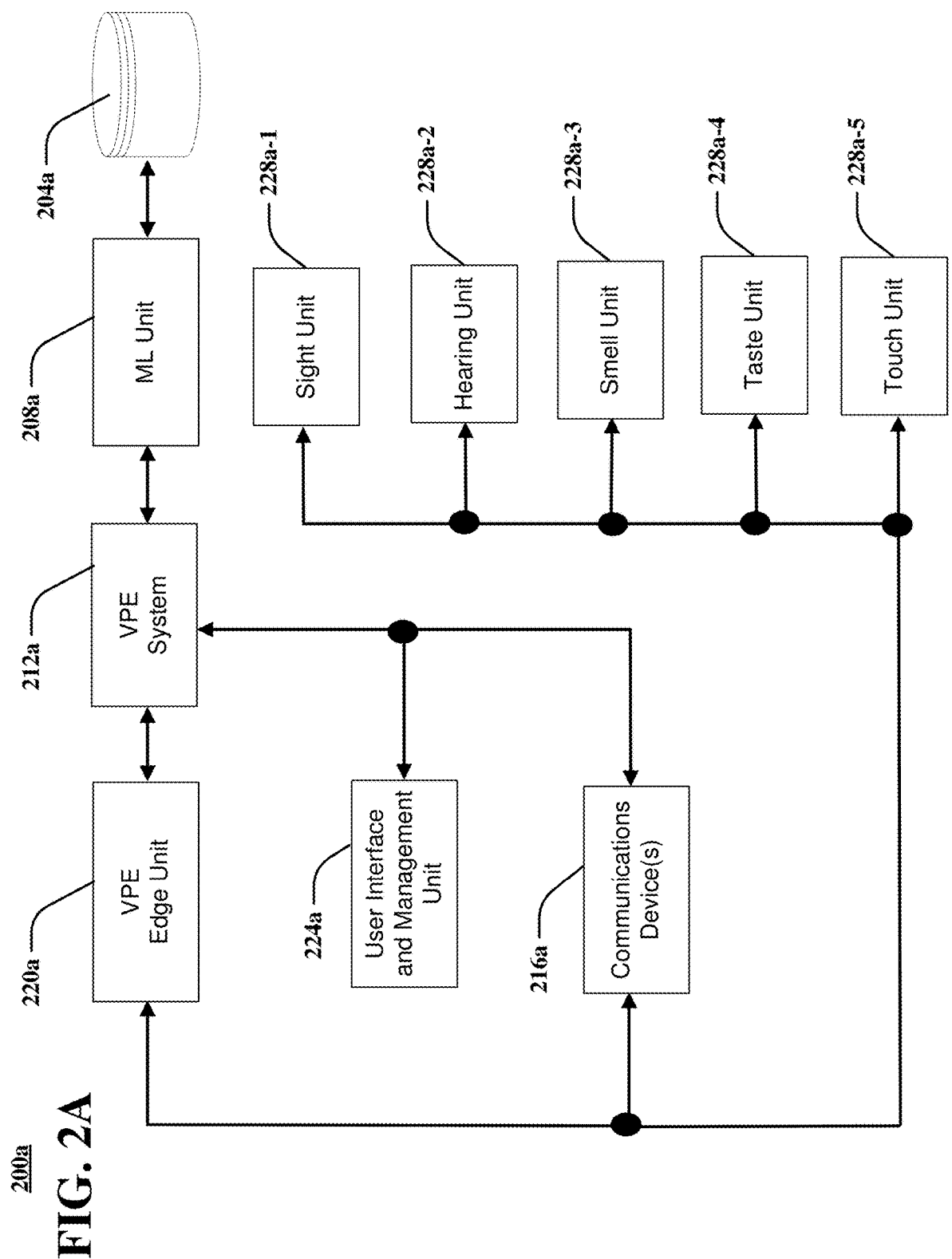
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a functioning within, or operatively overlaid upon, the communication network of FIG. 1 in accordance with various aspects described herein. The system 200a may be used to generate and present a virtual object, such as for example a hologram. The virtual object may be rendered/presented in the physical/real world, resulting in a mixed reality (MR) environment.

The system 200a may include a data storage unit 204a. As an illustrative example, the data storage unit 204a may include one or more servers, databases, memories, computer/machine-readable media, etc. As described in further detail below, the data storage unit 204a may include data that may at least partially describe, or otherwise characterize, the look/appearance, behaviors, etc., of virtual objects that may be rendered via the system 200a. The data of the data storage unit 204a may be provided by/sourced from one or more sources, such as for example one or more social media networks/platforms, websites, networks, etc.

The system 200a may include a machine learning (ML) unit 208a. The ML unit 208a may analyze the data present in the data storage unit 204a to identify characteristics (e.g., patterns) associated with the data. Based on the identified characteristics of the data, the ML unit 208a may generate one or more outputs that may influence/impact the virtual objects that are generated/rendered by the system 200a. In some embodiments, the ML unit 208a may generate such outputs based on one or more user inputs.

The system 200a may include a virtual physical emulator (VPE) system 212a. In some embodiments, the VPE system 212a may be embodied/implemented as one or more computing devices, such as for example one or more servers, base stations/towers, control systems/units, etc. The VPE system 212a may include one or more requirements or specifications for virtual objects that may be generated/rendered in/by the system 200a. Collectively, the data storage unit 204a, the ML unit 208a, and the VPE system 212a may form a core or back-end of the system 200a. As the nomenclature implies, the core/back-end may be remotely located from one or more devices (e.g., communications device(s) 216a) that may be accessible or proximate to a user of the system 200a.

As described above, the communications devices 216a may include devices that may be accessible or proximate to a user. To demonstrate, the communications devices 216a may include one or more gateways, routers, modems, user equipment/client devices (e.g., mobile/smart phones, personal digital assistants (PDAs), laptops, desktop computers, tablets, etc.), etc. The communications devices 216a may enable a user to customize/tailor characteristics of a virtual object in accordance with one or more user inputs that may be received by/input to the communications devices 216a.

The system 200a may include a VPE edge unit 220a. Much like the VPE system 212a, the VPE edge unit 220a may include one or more requirements or specifications for virtual objects that may be generated/rendered in/by the system 200a. As the nomenclature implies, the VPE edge unit 220a may be located at, or proximate to, an edge/boundary of a communication network or cell. For example, in some embodiments the VPE edge unit 220a may located proximate to the communications devices 216a such that the VPE edge unit 220a may be communicatively coupled with the communications devices 216a using low-power signaling techniques (e.g., near-field communications (NFC) techniques).

In some embodiments, the VPE edge unit 220a may include a subset of the requirements/specifications contained/stored by the VPE system 212a. For example, the VPE edge unit 220a may include some, but less than all, of the requirement/specifications contained/stored by the VPE system 212a. In this manner, the VPE edge unit 220a may implement/incorporate aspects of a cache, whereby requirements/specifications that are likely to be needed or used by the communications devices 216a may be selected for inclusion in the VPE edge unit 220a. The ML unit 208a may provide for, or assist in, such a selection, potentially in accordance with one or more user or device profiles. In this manner, the VPE edge unit 220a may be accessed by, e.g., the communications devices 216a to reduce potential latency experienced by the communications devices 216a and/or to reduce load on the VPE system 212a. To the extent that a requirement/specification is not included within the VPE edge unit 220a, such a requirement/specification may be requested from the VPE system 212a (at the potential expense of increased latency and/or load).

In some embodiments, the VPE edge unit 220a may store/include requirements/specifications that are unique to the communications devices 216a (or users associated therewith). In this respect, the VPE system 212a may include general/generic/core requirements/specifications for a given virtual object, and the VPE edge unit 220a may store/include refinements/customizations to those general requirements/specifications that are particular/unique to the communications devices 216a (or users associated therewith). In some embodiments, such refinements/customizations may be shared with the core/back-end (e.g., the VPE system 212a) in order to allow other users/communications devices (not shown in FIG. 2A) to leverage such refinements/customizations (potentially via one or more social media platforms). In some embodiments, such refinements/customizations might not be shared with the core/back-end in view of potential privacy considerations.

In some embodiments, the VPE edge unit 220a may include one or more servers, base stations/towers, control systems/units, building (e.g., wall or ceiling) mounted units, etc. The VPE edge unit 220a may be a stationary unit (e.g., may be positioned on an object, such as a table, a shelf, a desk, etc.) and/or may be incorporated as part of a mobile unit (e.g., a cart, a motorized vehicle, a drone, etc.).

The system 200a may include a user interface and management unit 224a. The user interface and management unit 224a may provide an interface for a user to interface with/to the system 200a. In some embodiments, the user interface and management unit 224a may provide for user authentication with respect to the system 200a on the basis of a validation/verification of one or more credentials. The one or more credentials may include a username and password, a personal identification number (PIN), a biometric scan, facial recognition, a challenge question, CAPTCHA technology, etc., or any combination thereof. The validation/verification of such credentials may ensure that only authorized users/devices obtain access to the system 200a. Such authorization may be in accordance with one or more agreements (e.g., one or more subscriptions, licenses, etc.).

The user interface and management unit 224a may manage user inputs (e.g., user preferences). For example, the user interface and management unit 224a may receive user inputs directed to a user customization of characteristics associated with a virtual object; such a customization may be incorporated as part of the requirements/specifications stored by the VPE edge unit 220a as described above. Still further, the user inputs may specify user preferences/customizations that are acceptable for sharing with the core/back-end and/or preferences/customizations that are to be maintained in a state of privacy/secrecy.

In some embodiments, the user interface and management unit 224a may include an identification of one or more devices (e.g., communications devices 216a), such as for example a make, model, and serial number of the device(s). Virtual objects that are generated/rendered may be based on such identifications.

The system 200a may include one or more sensory units, such as for example sensory unit 228a-1 through sensory unit 228a-5. To demonstrate with respect to the so-called five (5) common senses, the units 228a-1 through 228a-5 may include a sight unit 228a-1, a hearing/auditory unit 228a-2, a smell unit 228a-3, a taste unit 228a-4, and a touch/haptic unit 228a-5. While the units 228a-1 through 228a-5 are shown separately in FIG. 2A, in some embodiments one or more of the units 228a-1 through 228a-5 may be included/integrated as part of one or more other entities, such as for example the communications devices 216a, the VPE edge unit 220a, and/or the user interface and management unit 224a.

The units 228a-1 through 228a-5 may be responsive to one or more instructions or commands issued/generated by, e.g., the communications devices 216a and/or the VPE edge unit 220a. For example, the units 228a-1 through 228a-5 may generate and provide one or more outputs in response to receiving such instructions or commands. In some embodiments, each of the units 228a-1 through 228a-5 (or combinations/groups of the units 228a-1 through 228a-5) may be actuated/accessed via a unique address. In this manner, the instructions/commands issued/generated by, e.g., the communications devices 216a and/or the VPE edge unit 220a may include an address that is particular to a unit 228a-1 through 228a-5 (or group of units) to select/actuate that particular unit.

The sight unit 228a-1 may include one or more pieces of equipment that may be used to render visual aspects of a virtual object. Such visual aspects may be perceived by a user's eye and/or by visual image detection equipment of other devices/units. In some embodiments, the sight unit 228a-1 may include one or more lasers, projectors, lenses, etc. The sight unit 228a-1 may receive one or more images, videos, etc., as a specification for generating the visual aspects of a particular virtual object.

The hearing/auditory unit 228a-2 may include one or more pieces of equipment that may be used to render auditory aspects of a virtual object. For example, the hearing/auditory unit 228a-2 may include one or more speakers that may generate sound waves that may be perceived by a user's ear and/or by auditory detection equipment of other devices/units. In some embodiments, the hearing/auditory unit 228a-2 may include a microphone that may detect sound waves emitted by users, animals, and/or objects. The detection of such sound waves via the microphone may facilitate a closed-loop system, whereby inputs may be transformed/operated on in accordance with the generation of one or more outputs.

The smell unit 228a-3 may include a repository of one or more scents or fragrances that may be selectively emitted. As an illustrative example, if a virtual object rendered by the system 200a corresponds to a jasmine flower, the smell unit 228a-3 may emit a perfume with hints of jasmine extract or other "sweet-smelling" odors. Similarly, if a virtual object rendered by the system 200a corresponds to a wet dog, the smell unit 228a-3 may emit a musty, damp-like smell. Various chemical substances/compositions may be stored by the smell unit 228a-3 to create various smells for use in conjunction with a generation/rendering of virtual objects. The chemical substances/compositions may be stand-alone or may be attached to/associated with one or more other objects, such as for example a cloth or fabric.

The taste unit 228a-4 may include a repository of one or more flavors, foods, beverages, etc., that may be selectively emitted. As an illustrative example, if a virtual object rendered by the system 200a corresponds to a honeysuckle flower, the taste unit 228a-4 may emit a honeysuckle flavored extract, honey, or the like, to simulate the taste of a honeysuckle bloom. Various flavors, extracts, products (e.g., food/beverage products), etc., may be stored by the taste unit 228a-4 to create various tastes for use in conjunction with a generation/rendering of virtual objects.

The touch/haptic unit 228a-5 may include one or more pieces of equipment (e.g., pulsed lasers) that may energize air molecules in proximity to a virtual object that is rendered. The energy imparted on the air molecules by the equipment (which may be operative in accordance with femtosecond wavelengths and/or may be operative on the basis of ultrasonic radiation) may cause the air molecules to ionize (e.g., release an electron). The resulting mix of positive and negative air particles is frequently referred to as plasma in the art. When a user (e.g., a human) contacts the plasma, the user may feel vibrations of the plasma due to the imparted energy. In this respect, the virtual object may include characteristics of touch/feel on the basis of the vibrations.

To the extent that the equipment (e.g., lasers) of the touch/haptic unit 228a-5 are operative in accordance with elevated power levels (e.g., power levels that are greater than a threshold), the point(s) in three-dimensional space where the air molecules are energized may be selected to be sufficiently far enough away (e.g., may be selected to be a threshold distance away) from users or other objects to avoid negatively impacting such users/other objects. In this manner, a user may be able to "feel" a virtual object while still maintaining an adequate margin of safety with respect to the user. In this respect, the touch/haptic unit 228a-5 may include, e.g., Global Positioning System (GPS) coordinate/ sensing devices, thermal imaging equipment, etc., to detect a location/positon of a user, movements of the user, etc.

As just described, the units 228a-1 through 228a-5 may be used to appeal to/trigger/stimulate the five common senses associated with user perception in conjunction with a rendering of a virtual objects. The senses may be stimulated dynamically, which is to say that the senses may be stimulated/triggered in a coordinated manner via the addressing scheme described above. To continue the above example regarding the rendering of a virtual honeysuckle, in the early morning hours of a given day, a honeysuckle bud/flower may appear to be partially or fully closed (via the sight unit 228a-1). As the day progresses (e.g., in the early afternoon), the honeysuckle bud/flower may appear to open (via the sight unit 228a-1), honeysuckle fragrances may begin to be emitted by the smell unit 228a-3 and honeysuckle extract/ flavoring may be emitted by the taste unit 228a-5; simultaneously, or some time thereafter, sounds of chirping birds may be generated by the hearing/auditory unit 228a-2. As the afternoon turns into evening, the honeysuckle bud/flower may appear to close (via the sight unit 228a-1), the smell unit 228a-3 may begin to cease emitting honeysuckle fragrances, and the taste unit 228a-5 may begin to cease emitting honeysuckle extract/flavoring. During the course of the day, the touch/haptic unit 228a-5 may energize air molecules (with various energies/frequencies) to provide for various haptic sensations with respect to the honeysuckle flower.

As described above, while the units 228a-1 through 228a-5 may be engaged to stimulate a human/user's senses, outputs of the units 228a-1 through 228a-5 may be used to stimulate other devices/units. For example, sensors of such other devices/units may be stimulated in accordance with the outputs of the units 228a-1 through 228a-5. To take an illustrative example, in the context of operating an autonomous vehicle, the autonomous vehicle may be fitted with one or more sensors in order to detect nearby/approaching objects. For example, a sensor of the vehicle may emit a first signal and may receive a second signal that corresponds to a reflected version of the first signal. Energizing the air molecules in proximity to a virtual object (e.g., a virtual fence that borders a street) via the touch/haptic unit 228a-5 may "trick" the sensor of the vehicle into believing that the fence is actually/physically present. Upon detecting the virtual fence, the vehicle may be instructed/commanded to steer clear of the virtual fence. Thus, in this illustrative example, the system 200a may be used to provide for control over autonomous vehicle operation, which may be included as part of a broader application for regulating/coordinating vehicle traffic conditions. Still further, in some instances the touch/haptic unit 228a-5 may be disabled based on an identity of the vehicle. For example, the touch/haptic unit 228a-5 might not be enabled at/proximate to a location of emergency services vehicles (police, fire, ambulance, etc.) to allow the emergency services vehicles to cross the virtual fence.

Figure 2B:
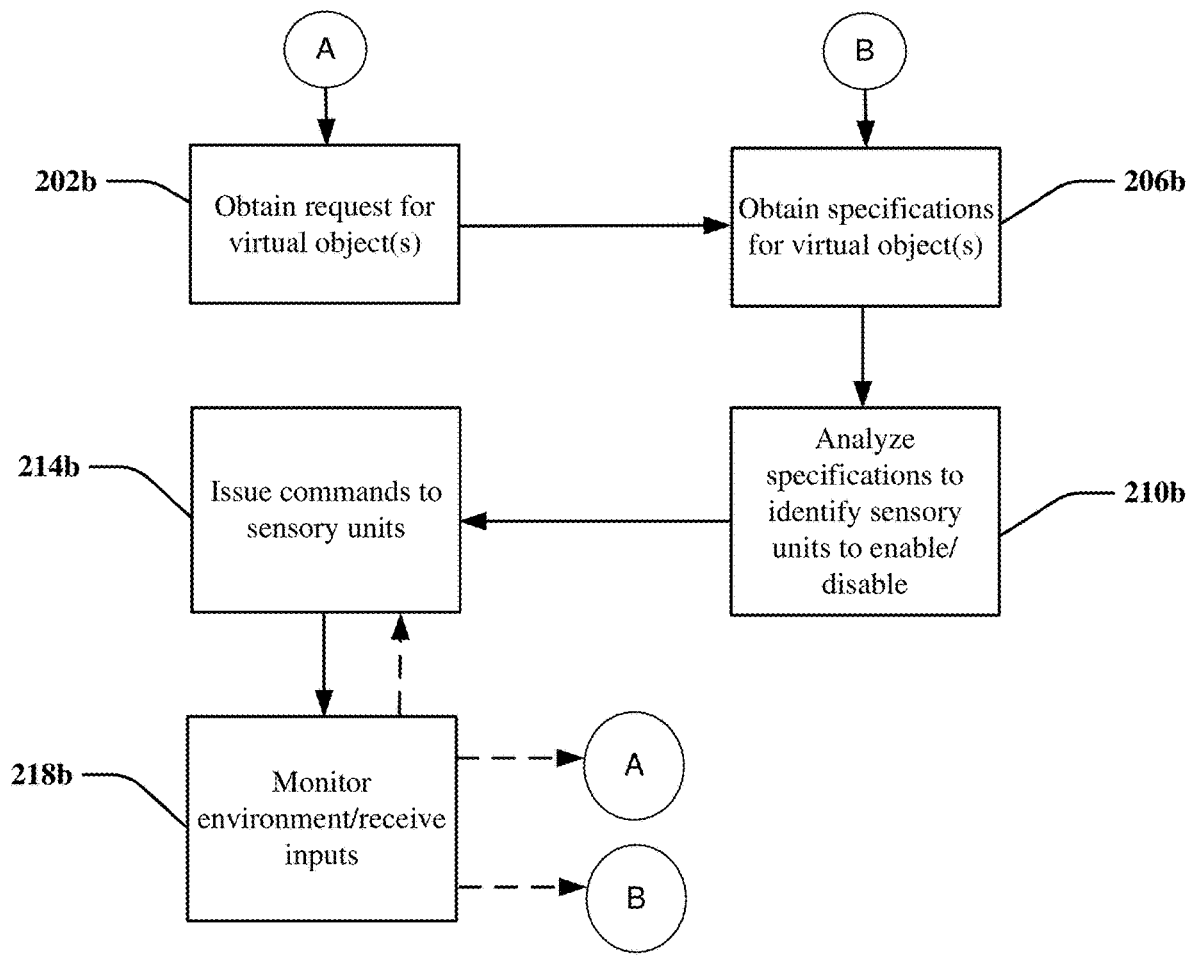
FIG. 2B depicts an illustrative embodiment of a method in accordance with various aspects described herein.

FIG. 2B depicts an illustrative embodiment of a method 200b in accordance with various aspects described herein. The method 200b is described below in relation to the systems, devices, and units of the system 200a for the sake of convenience and ease in illustration. One skilled in the art will appreciate, based on a review of this disclosure, that aspects of the method 200b may be implemented/incorporated with other systems, devices, units, and/or components.

In block 202b, a request may be obtained (e.g., received) for generating (e.g., presenting, rendering, storing, etc.) one or more virtual objects. The request may be received from a communications device (e.g., communications device 216a of FIG. 2A), potentially based on, or in response to, one or more user inputs. In some embodiments, the request may be based on one or more conditions, such as for example a time of day, an occurrence of an event, etc.

In block 206b, one or more requirements/specifications for the virtual object(s) (of block 202b) may be obtained. For example, the requirements/specifications may be based on data of a data storage unit (e.g., data storage unit 204a of FIG. 2A). The requirements/specifications may be based on algorithms executed in accordance with a ML unit (e.g., ML unit 208a of FIG. 2A). The requirements/specifications (e.g., the data) may be obtained from/stored at one or more VPE entities (e.g., the VPE system 212a and/or the VPE edge unit 220a of FIG. 2A) as part of block 206b.

In block 210b, the requirements/specifications (of block 206b) may be analyzed to determine/identify sensory units (e.g., units 228a-1 through 228a-5 of FIG. 2A), or other units, to enable/engage/activate (or, analogously, disable/disengage/deactivate). For example, as part of block 210b one or more commands/instructions may be determined/identified/generated to selectively enable/disable a sensory unit (or other unit). The commands may be generated so as to synchronize or coordinate the timing of outputs provided by the sensory units (potentially in conjunction with other outputs or conditions) or other units.

In block 214b, the commands identified in block 214b may be transmitted/issued to the units. As part of block 214b, the units may receive the commands and may be operative in accordance with (e.g., may respond to) the commands to generate one or more outputs.

Thus, following (or concurrent with) the execution of block 214b, one or more virtual objects may be generated. As part of block 214b, the virtual object(s) may be rendered, saved/stored for future use, etc.

In block 218b, an environment in which the virtual object(s) (of block 214b) are rendered may be monitored for one or more inputs (e.g., events, conditions, user inputs, etc.). For example, a context in which a first virtual object is rendered may be monitored to determine whether the context calls for a rendering of a second virtual object. As part of block 218b, one or more users' interactions with the virtual object(s) may be monitored to assess whether an output associated with the rendering of the virtual object(s) requires/needs update/modification. If so, flow may proceed from block 218b to block 214b, such that updated/modified commands may be issued to the units in accordance with the inputs of block 218b.

In some instances, the monitored inputs of block 218b may correspond to a request for a new or different virtual object. In this respect, in some instances the flow of the method 200b may proceed from block 218b to block 202b to request the generation of the new/different virtual object. In this regard, blocks of the method 200b may be executed iteratively/repeatedly, potentially on the basis of different sets of inputs, to generate various types/kinds of virtual objects at various points in time.

In some instances, the monitored inputs of block 218b may correspond to a request to modify a characteristic (e.g., an appearance, a sound, a smell, a taste, a feel, a behavior, etc.) of the virtual object(s) generated (e.g., rendered) as part of block 214b. In this respect, in some instances the flow of the method 200b may proceed from block 218b to block 206b to modify the specification(s) for the virtual object(s). The modifications may be saved/stored as part of the flow from block 218b to block 206b. For example, the modifications may supplement and/or overwrite the pre-existing versions of the specifications obtained as part of the prior execution of block 206b.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. As described above, various blocks (or one or more portions thereof) of the method 200b may be executed iteratively/repeatedly (e.g., as part of a feedback loop) in order to modify (e.g., enhance) one or more characteristics of a virtual object.

Figure 2C:
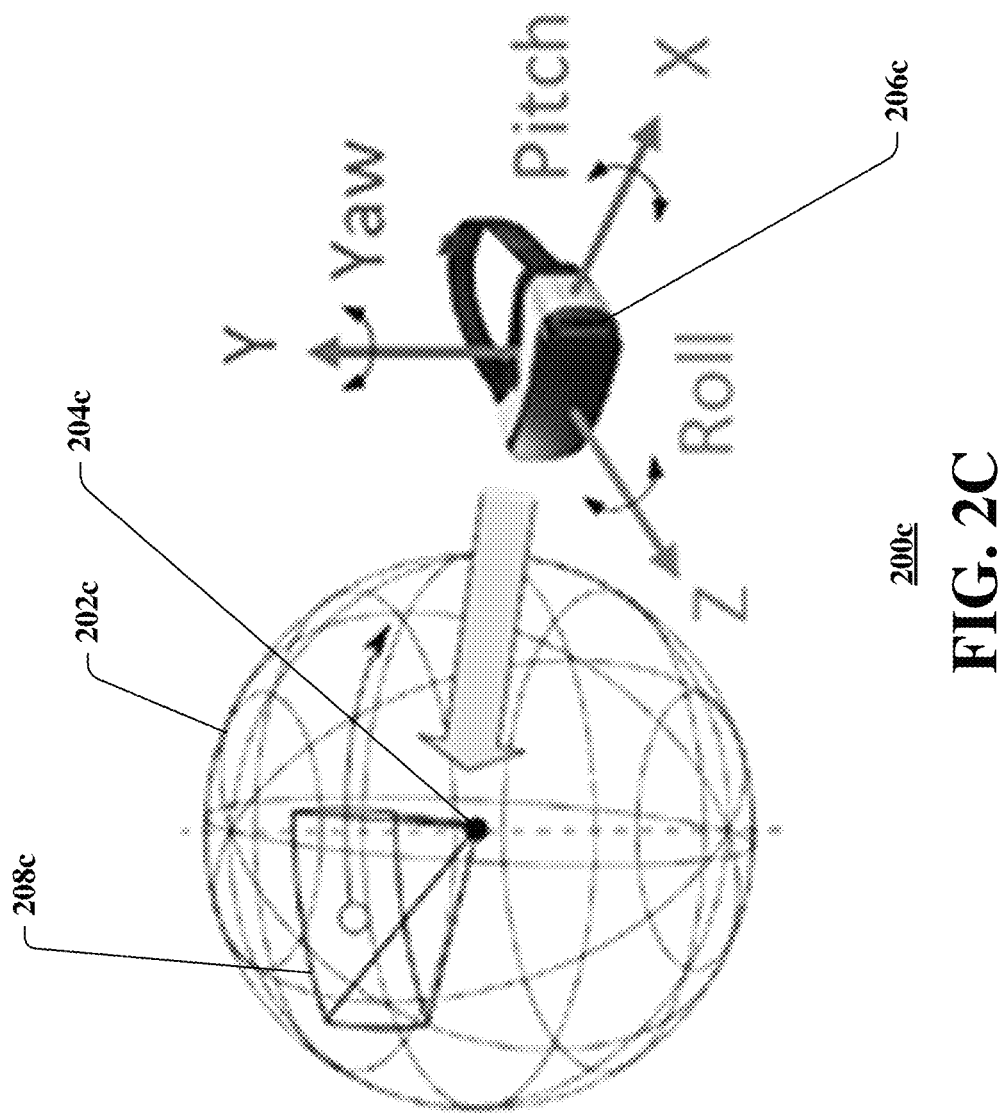
FIG. 2C depicts an illustrative embodiment of a method in accordance with various aspects described herein.

Aspects of the disclosure may be operative in conjunction with one or more devices, such as for example one or more communications devices (see, e.g., communications devices 216a of FIG. 2A). Referring to FIG. 2C, a block diagram is shown illustrating an example, non-limiting embodiment of a system 200c functioning within the communication network 100 of FIG. 1 and/or the system 200a of FIG. 2A in accordance with various aspects described herein. The system 200c may be used to implement one or more aspects of the methods described herein (see, e.g., the method 200b of FIG. 2B).

The system 200c may be used to generate (e.g., present/render, store, etc.) one or more virtual objects. In some embodiments, the virtual objects may be presented in accordance with a panoramic model. For example, panoramic images or videos may be recorded by omnidirectional cameras or camera array systems, and then "wrapped" onto at least a portion of a three-dimensional (3D) sphere (e.g., 3D sphere 202c), with the cameras at or proximate a center 204c of the sphere. When watching a panoramic video (which may include virtual objects embedded therein), a user/viewer at the spherical center 204c can freely control her viewing direction, so each playback may create a unique viewing experience. The control of viewing directions may be achieved through, e.g., head movement when using a head-mounted device, hand/finger movement when using a mobile/portable communication device (e.g., a phone or a tablet), a mouse click when using a laptop or desktop computer, or use of a remote control or trackball when using a display device such as a television. Other techniques, such as for example gesture recognition, may be used. One or more combinations of the controls described above may be used.

As shown in FIG. 2C, a cross reality (XR) headset 206c can be used to adjust a viewing orientation by changing the pitch, yaw, and/or roll, which correspond to movement (e.g., rotation) along the super-imposed X, Y, and Z axes, respectively. The headset 206c may support operations in accordance with six degrees/dimensions of freedom. For example, the X, Y, and Z axes collectively represent three dimensions of freedom, and movement along any one of the axes (e.g., in a plus or minus direction) represents another degree/dimension of freedom.

Panoramic players may compute and display the viewing area based on the viewing orientation and the field of view (FoV). The FoV defines the extent of an observable area 208c, which may be a fixed or dynamic parameter of the headset 206c. In an illustrative embodiment, the observable area 208c may be 110° horizontally (+/−10%) and 90° vertically (+/−10%). Other values of the observable area 208c may be used in some embodiments.

A number of projection schemes may be used for creating/generating panoramic content. As used herein, a projection is a transformation of the locations from the surface of a sphere (e.g., sphere 202c) into locations on a plane (where the plane may substantially correspond to the observable area 208c). As one skilled in the art would appreciate, two popular/common projection techniques are equirectangular and cube map.

As described herein, aspects of the disclosure may be used to generate virtual objects (e.g., holograms). Characteristics of the virtual objects may have a temporal component/element associated with them, which is to say that the characteristics of the virtual objects may change over time, potentially in response to one or more inputs (e.g., events, conditions, user inputs, a passage of time, etc.). In some embodiments, such dynamic/temporal characteristics may be absent, which is to say that the characteristics of one or more virtual objects may be static in nature.

Aspects of the disclosure may be implemented in accordance with one or more communication networks. To continue the example of generating a virtual barrier/fence, a number of people located within a given geographic region/area may be determined/monitored in accordance with a location tracking technology associated with user equipment/client devices. When the number of people located within the given geographic region exceeds a threshold, a location of a barrier/fence may be moved to create additional space for the people to stand, sit, etc. In this regard, the location of the barrier/fence may be dynamically adjusted for crowd control purposes to ensure that sufficient room/space is available and to avoid a "panic" scenario where people may tend to feel claustrophobic. In conjunction with the adjustment of the virtual barrier/fence, a text message, an email, or the like, may be presented by each of the user equipment/client devices, instructing the user of the user equipment/client device to relocate to a new, specified position.

Aspects of the disclosure may be used in connection with any number/type of application or environment. Some of the examples described above pertain to animals (e.g., pets such as a dog), barriers/fences for, e.g., traffic or crowd control or autonomous vehicle operations, plants (e.g., flowers) and the like. Additional examples of applications that may benefit from the generation of virtual objects include railroad crossings (e.g., alerts for pedestrians or motor vehicles), virtual lanes for drones with lines and elevation markings, underground utility markings with alerts for those who dig nearby, fences/barriers advising of construction zones, street, and/or beach/park closures, virtual lanes for temporary marking purposes in construction zones and the like, hunting and fishing area boundaries, police corridors, lines such as present at movie theaters/cinema houses to direct people where to stand, police corridors (such as those for crime scenes or other events), virtual guard rails to protect visitors from dangers (e.g., falls from elevation), bus or railroad stops (e.g., a virtual box/booth for people to stay in while awaiting the arrival of the bus or railcar), etc.

Aspects of the disclosure may be incorporated as part of an intelligent network of devices. For example, aspects of the disclosure may be included as part of a network of Internet of Things (IoT) devices. Such devices may share data with one another, whereby the data provided/output by a first of the devices may serve as an input to a second of the devices. The second of the devices may process the data provided by the first of the devices, potentially in conjunction with one or more other inputs, to generate one or more outputs (e.g., one or more warnings, notifications, statuses, alerts, etc.).

As described above, aspects of the disclosure may include a generation of one or more virtual objects. The virtual objects may adhere/conform to one or more requirements/specifications that may be based on data obtained/sourced from one or more sources. The virtual objects may include nested virtual objects (e.g., a first virtual object included/encased within one or more other virtual objects). The virtual objects may be incorporated/implemented as part of the physical world, thereby blending or obscuring the traditional boundaries between the virtual and physical world.

Data associated with one or more networks may provide a general framework for generating a virtual object and for defining characteristics of the virtual object. Thereafter, the data may be modified or supplemented to alter or enhance one or more characteristics of the virtual object. Modifications may be maintained in a state of privacy/secrecy and/or may be shared with other users or devices via one or more communications via the network(s).

Aspects of the disclosure may be applied in connection with network/service operators/providers (e.g., augmented/virtual reality wireless carriers), geolocation solution architectures, and device manufacturers. Law enforcement/crowd control officials, transportation, entertainment, and utility companies/organizations may leverage aspects of this disclosure to facilitate various operations under their respective controls/jurisdictions.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200a, the method 200b, and the system 200c presented in FIGS. 1, 2A, 2B, and 2C. For example, virtualized communication network 300 can facilitate in whole or in part obtaining a first request for a first virtual object, obtaining first data regarding the first virtual object responsive to the obtaining of the first request, analyzing the first data to identify a first plurality of characteristics for the first virtual object, wherein the first plurality of characteristics includes a first visual aspect of the first virtual object, a first auditory aspect of the first virtual object, a first scent aspect of the first virtual object, and a first haptic aspect of the first virtual object, and responsive to the analyzing of the first data, enabling at least a first sensory unit of a plurality of sensory units to render the first virtual object in accordance with the first plurality of characteristics. Virtualized communication network 300 can facilitate in whole or in part obtaining a first specification regarding a first virtual object via a first network, receiving a first request from a first communications device for the first virtual object, responsive to the receiving of the first request for the first virtual object, analyzing the first specification to identify a first plurality of characteristics for the first virtual object, rendering the first virtual object within a threshold distance of the first communications device in accordance with the first plurality of characteristics, wherein the rendering occurs via a second network, and subsequent to the rendering of the first virtual object, obtaining at least one input that causes a modification to the rendering of the first virtual object resulting in a second plurality of characteristics for the first virtual object, wherein the second plurality of characteristics are at least partially differentiated from the first plurality of characteristics. Virtualized communication network 300 can facilitate in whole or in part identifying at least a first characteristic associated with a first virtual object in accordance with first data associated with the first virtual object, wherein the at least a first characteristic comprises a first visual aspect of the first virtual object, a first auditory aspect of the first virtual object, a first scent aspect of the first virtual object, a first haptic aspect of the first virtual object, or any combination thereof, responsive to the identifying, rendering the first virtual object in accordance with the at least a first characteristic, obtaining at least a first input that is directed to a first modification of a second characteristic of the first virtual object, the obtaining of the at least a first input resulting in a first modified characteristic of the first virtual object, responsive to the obtaining of the at least a first input, modifying the first data in accordance with the first modified characteristic of the first virtual object, the modifying resulting in second data, and responsive to the modifying, storing the second data such that subsequent to the storing the first virtual object is rendered according to the first modified characteristic.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
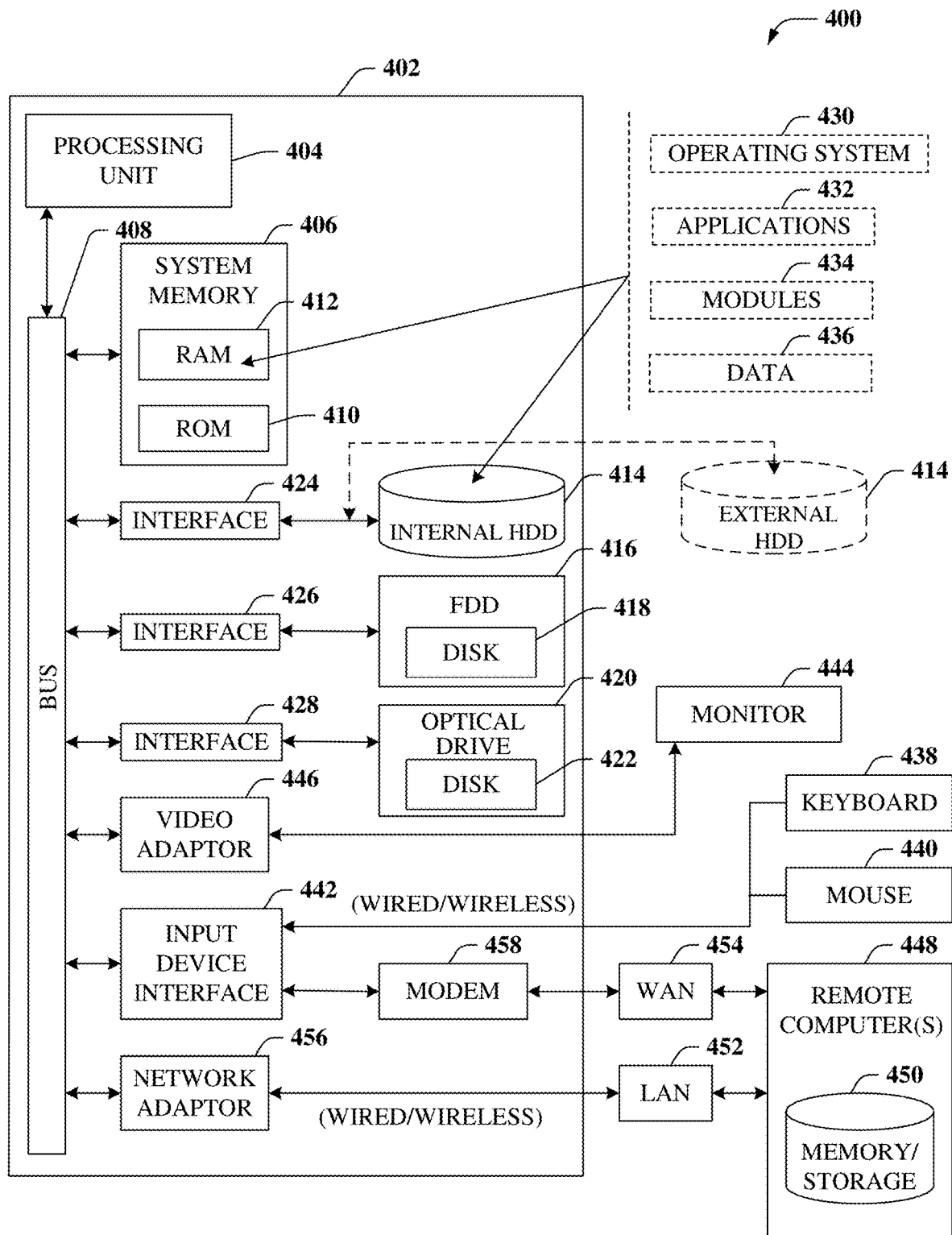
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining a first request for a first virtual object, obtaining first data regarding the first virtual object responsive to the obtaining of the first request, analyzing the first data to identify a first plurality of characteristics for the first virtual object, wherein the first plurality of characteristics includes a first visual aspect of the first virtual object, a first auditory aspect of the first virtual object, a first scent aspect of the first virtual object, and a first haptic aspect of the first virtual object, and responsive to the analyzing of the first data, enabling at least a first sensory unit of a plurality of sensory units to render the first virtual object in accordance with the first plurality of characteristics. Computing environment 400 can facilitate in whole or in part obtaining a first specification regarding a first virtual object via a first network, receiving a first request from a first communications device for the first virtual object, responsive to the receiving of the first request for the first virtual object, analyzing the first specification to identify a first plurality of characteristics for the first virtual object, rendering the first virtual object within a threshold distance of the first communications device in accordance with the first plurality of characteristics, wherein the rendering occurs via a second network, and subsequent to the rendering of the first virtual object, obtaining at least one input that causes a modification to the rendering of the first virtual object resulting in a second plurality of characteristics for the first virtual object, wherein the second plurality of characteristics are at least partially differentiated from the first plurality of characteristics. Computing environment 400 can facilitate in whole or in part identifying at least a first characteristic associated with a first virtual object in accordance with first data associated with the first virtual object, wherein the at least a first characteristic comprises a first visual aspect of the first virtual object, a first auditory aspect of the first virtual object, a first scent aspect of the first virtual object, a first haptic aspect of the first virtual object, or any combination thereof, responsive to the identifying, rendering the first virtual object in accordance with the at least a first characteristic, obtaining at least a first input that is directed to a first modification of a second characteristic of the first virtual object, the obtaining of the at least a first input resulting in a first modified characteristic of the first virtual object, responsive to the obtaining of the at least a first input, modifying the first data in accordance with the first modified characteristic of the first virtual object, the modifying resulting in second data, and responsive to the modifying, storing the second data such that subsequent to the storing the first virtual object is rendered according to the first modified characteristic.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
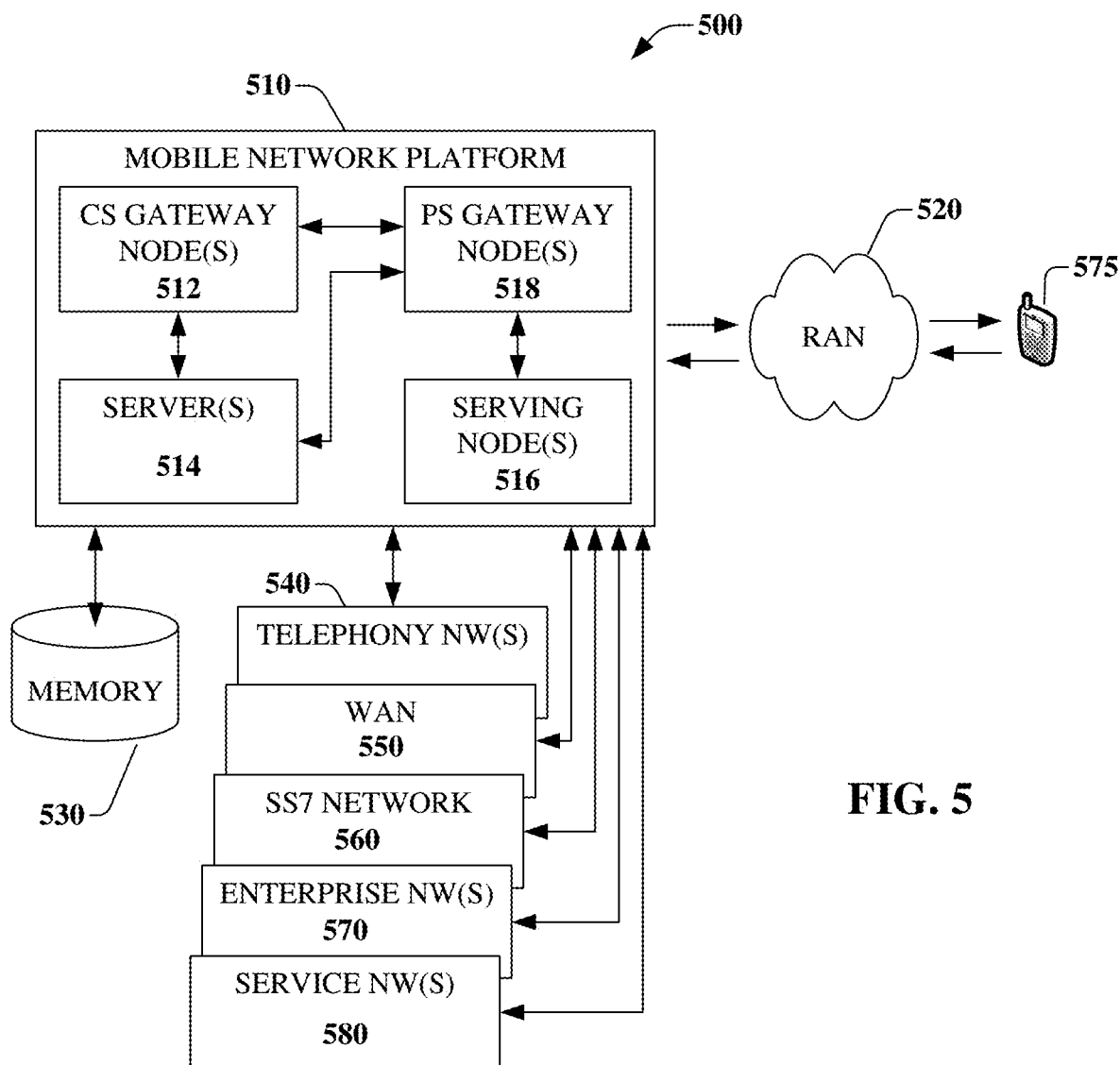
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining a first request for a first virtual object, obtaining first data regarding the first virtual object responsive to the obtaining of the first request, analyzing the first data to identify a first plurality of characteristics for the first virtual object, wherein the first plurality of characteristics includes a first visual aspect of the first virtual object, a first auditory aspect of the first virtual object, a first scent aspect of the first virtual object, and a first haptic aspect of the first virtual object, and responsive to the analyzing of the first data, enabling at least a first sensory unit of a plurality of sensory units to render the first virtual object in accordance with the first plurality of characteristics. Platform 510 can facilitate in whole or in part obtaining a first specification regarding a first virtual object via a first network, receiving a first request from a first communications device for the first virtual object, responsive to the receiving of the first request for the first virtual object, analyzing the first specification to identify a first plurality of characteristics for the first virtual object, rendering the first virtual object within a threshold distance of the first communications device in accordance with the first plurality of characteristics, wherein the rendering occurs via a second network, and subsequent to the rendering of the first virtual object, obtaining at least one input that causes a modification to the rendering of the first virtual object resulting in a second plurality of characteristics for the first virtual object, wherein the second plurality of characteristics are at least partially differentiated from the first plurality of characteristics. Platform 510 can facilitate in whole or in part identifying at least a first characteristic associated with a first virtual object in accordance with first data associated with the first virtual object, wherein the at least a first characteristic comprises a first visual aspect of the first virtual object, a first auditory aspect of the first virtual object, a first scent aspect of the first virtual object, a first haptic aspect of the first virtual object, or any combination thereof, responsive to the identifying, rendering the first virtual object in accordance with the at least a first characteristic, obtaining at least a first input that is directed to a first modification of a second characteristic of the first virtual object, the obtaining of the at least a first input resulting in a first modified characteristic of the first virtual object, responsive to the obtaining of the at least a first input, modifying the first data in accordance with the first modified characteristic of the first virtual object, the modifying resulting in second data, and responsive to the modifying, storing the second data such that subsequent to the storing the first virtual object is rendered according to the first modified characteristic.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
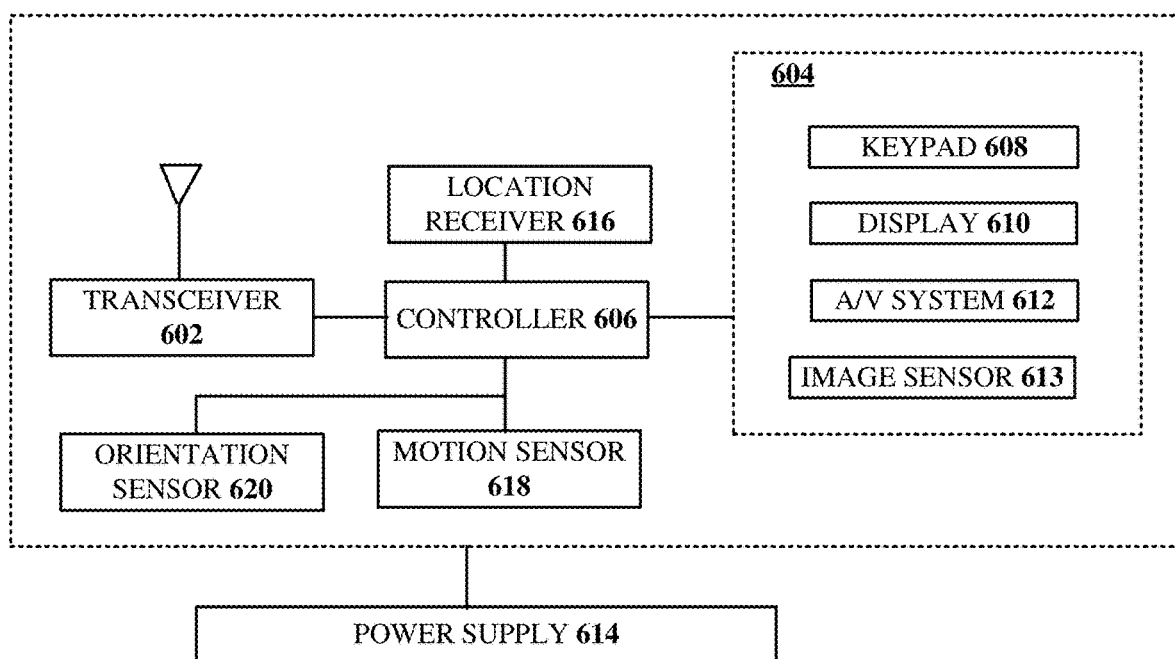
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining a first request for a first virtual object, obtaining first data regarding the first virtual object responsive to the obtaining of the first request, analyzing the first data to identify a first plurality of characteristics for the first virtual object, wherein the first plurality of characteristics includes a first visual aspect of the first virtual object, a first auditory aspect of the first virtual object, a first scent aspect of the first virtual object, and a first haptic aspect of the first virtual object, and responsive to the analyzing of the first data, enabling at least a first sensory unit of a plurality of sensory units to render the first virtual object in accordance with the first plurality of characteristics. Computing device 600 can facilitate in whole or in part obtaining a first specification regarding a first virtual object via a first network, receiving a first request from a first communications device for the first virtual object, responsive to the receiving of the first request for the first virtual object, analyzing the first specification to identify a first plurality of characteristics for the first virtual object, rendering the first virtual object within a threshold distance of the first communications device in accordance with the first plurality of characteristics, wherein the rendering occurs via a second network, and subsequent to the rendering of the first virtual object, obtaining at least one input that causes a modification to the rendering of the first virtual object resulting in a second plurality of characteristics for the first virtual object, wherein the second plurality of characteristics are at least partially differentiated from the first plurality of characteristics. Computing device 600 can facilitate in whole or in part identifying at least a first characteristic associated with a first virtual object in accordance with first data associated with the first virtual object, wherein the at least a first characteristic comprises a first visual aspect of the first virtual object, a first auditory aspect of the first virtual object, a first scent aspect of the first virtual object, a first haptic aspect of the first virtual object, or any combination thereof, responsive to the identifying, rendering the first virtual object in accordance with the at least a first characteristic, obtaining at least a first input that is directed to a first modification of a second characteristic of the first virtual object, the obtaining of the at least a first input resulting in a first modified characteristic of the first virtual object, responsive to the obtaining of the at least a first input, modifying the first data in accordance with the first modified characteristic of the first virtual object, the modifying resulting in second data, and responsive to the modifying, storing the second data such that subsequent to the storing the first virtual object is rendered according to the first modified characteristic.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
analyzing first data obtained from a first source to identify a first plurality of characteristics for a first virtual object;
responsive to the analyzing of the first data, enabling at least a first sensory unit of a plurality of sensory units to render the first virtual object in accordance with the first plurality of characteristics;
modifying the first data to generate second data regarding the first virtual object;
storing the second data to a second source;
obtaining a request from a first communications device for the first virtual object subsequent to the storing of the second data to the second source;
responsive to the obtaining of the request, analyzing the second data as accessed from the second source and at least one profile associated with the first communications device, a first user of the first communications device, or a combination thereof, to identify a second plurality of characteristics for the first virtual object; and
responsive to the analyzing of the second data and the at least one profile, enabling at least one of the plurality of sensory units to render the first virtual object in accordance with the second plurality of characteristics.

2. The device of claim 1, wherein the operations further comprise:
obtaining an input subsequent to the enabling of the at least a first sensory unit;
responsive to the obtaining of the input, analyzing the input in conjunction with the first data to identify a third plurality of characteristics for the first virtual object, wherein the third plurality of characteristics is at least partially differentiated from the first plurality of characteristics; and
rendering the first virtual object in accordance with the third plurality of characteristics by disabling the at least a first sensory unit, enabling at least a second sensory unit of the plurality of sensory units, or a combination thereof.

3. The device of claim 2, wherein the input comprises a user input generated by the first user of the first communications device, and wherein the operations further comprise:
obtaining a request from a second communications device for the first virtual object subsequent to storing the second data to the first source;
analyzing the second data and a second at least one profile associated with the second communications device, a second user of the second communications device, or a combination thereof, to identify a fourth plurality of characteristics for the first virtual object; and
responsive to the analyzing of the second data and the second at least one profile, enabling at least one of the plurality of sensory units to render the first virtual object in accordance with the fourth plurality of characteristics.

4. The device of claim 3, wherein the first data identifies a first location of a first haptic aspect of the first virtual object relative to a second location of the first user.

5. The device of claim 4, wherein the at least a first sensory unit comprises a first haptic unit, wherein the first haptic unit comprises a pulsed laser, and wherein the first data identifies an operating output power level associated with the pulsed laser, an operating frequency associated with the pulsed laser, or a combination thereof, in accordance with the first location of the first haptic aspect relative to the second location of the first user.

6. The device of claim 2, wherein the input comprises third data generated by a user equipment, a sensor, or a combination thereof.

7. The device of claim 2, wherein the input corresponds to a passage of time, an occurrence of an event or condition that is being monitored by the processing system, or a combination thereof.

8. The device of claim 2, wherein the third plurality of characteristics include a visual aspect of the first virtual object, an auditory aspect of the first virtual object, a scent aspect of the first virtual object, a haptic aspect of the first virtual object, or any combination thereof.

9. The device of claim 1, wherein the operations further comprise:
subsequent to the enabling of the at least a first sensory unit, determining that a number of communications devices within a threshold distance of the first virtual object is greater than a threshold amount; and
responsive to the determining that the number of communications devices within the threshold distance of the first virtual object is greater than the threshold amount, disabling the at least a first sensory unit, enabling a second sensory unit of the plurality of sensory units, or a combination thereof, to render the first virtual object in accordance with a third plurality of characteristics, wherein the third plurality of characteristics is at least partially differentiated from the first plurality of characteristics.

10. The device of claim 1, wherein the enabling of the at least a first sensory unit causes the first virtual object to be rendered as part of a panoramic content item.

11. The device of claim 1, wherein the first plurality of characteristics includes a first taste aspect associated with the first virtual object.

12. The device of claim 1, wherein the operations further comprise:
subsequent to the enabling of the at least a first sensory unit, obtaining an input that indicates that a context of an environment in which the first virtual object is rendered calls for a second virtual object; and
responsive to the obtaining of the input, rendering the second virtual object in accordance with a third plurality of characteristics by enabling at least a second sensory unit of the plurality of sensory units.

13. A non-transitory machine-readable medium, comprising executable instructions that, when executed by a processing system including a processor, facilitate performance of operations, the operations comprising:
receiving a first request from a first communications device for a first virtual object;

responsive to the receiving of the first request for the first virtual object, analyzing first data from a first network to identify a first plurality of characteristics for the first virtual object;

rendering the first virtual object in accordance with the first plurality of characteristics, wherein the rendering occurs via a second network; and subsequent to the rendering of the first virtual object, obtaining at least one input that causes a modification to the first data to generate second data regarding the rendering of the first virtual object, the modification resulting in a second plurality of characteristics for the first virtual object;

storing the second data in the first network and the second network;

obtaining a second request for the first virtual object subsequent to the storing of the second data in the second network;

responsive to the obtaining of the second request, accessing the second data from the second network without accessing the second data from the first network;

analyzing the second data accessed from the second network and at least one profile associated with the first communications device, a first user of the first communications device, or a combination thereof, to identify a third plurality of characteristics for the first virtual object; and responsive to the analyzing of the second data and the at least one profile, rendering the first virtual object in accordance with the third plurality of characteristics.

14. The non-transitory machine-readable medium of claim 13, wherein the obtaining of the second request comprises obtaining the second request from the first communications device.

15. The non-transitory machine-readable medium of claim 13, wherein the obtaining of the at least one input comprises receiving a user input from the first communications device via the second network.

16. The non-transitory machine-readable medium of claim 13, wherein the operations further comprise:
transmitting the second data to cause the second data to be stored in a database of the first network, a server of the first network, or a combination thereof, such that the second data is accessible to a second communications device communicatively coupled to the first network via a social media platform.

17. The non-transitory machine-readable medium of claim 13, wherein the rendering of the first virtual object in accordance with the first plurality of characteristics comprises an engagement of a first sensory unit that renders a visual aspect of the first virtual object, an engagement of a second sensory unit that renders an auditory aspect of the first virtual object, an engagement of a third sensory unit that renders a scent aspect of the first virtual object, and an engagement of a fourth sensory unit that renders a haptic aspect of the first virtual object, and wherein a behavior of the first virtual object is identified in accordance with the first plurality of characteristics and in response to a user input.

18. The non-transitory machine-readable medium of claim 13, wherein the receiving of the first request is responsive to a validation of at least one credential of a user of the first communications device.

19. A method, comprising:
obtaining, by a processing system including a processor, first data via a first network;

rendering, by the processing system, a first virtual object in accordance with a first characteristic that is based on the first data;

obtaining, by the processing system, a first input that is directed to a first modification of a second characteristic of the first virtual object, the obtaining of the first input resulting in a first modified characteristic of the first virtual object;

responsive to the obtaining of the first input, modifying, by the processing system, the first data in accordance with the first modified characteristic of the first virtual object, the modifying resulting in second data;

storing, by the processing system, the second data in a second network such that subsequent to the storing the first virtual object is rendered according to the first modified characteristic, wherein the second network is different from the first network;

subsequent to the storing of the second data, obtaining, by the processing system, a request for a second modification of a third characteristic of the first virtual object;

responsive to the obtaining of the request for the second modification of the third characteristic of the first virtual object, obtaining, by the processing system, third data associated with the first virtual object via the first network, wherein the third data includes the second modification of the third characteristic; and responsive to the obtaining of the third data, rendering, by the processing system, the first virtual object in accordance with the second modification of the third characteristic of the first virtual object.

20. The method of claim 19, further comprising:
receiving, by the processing system, a first request from a first communications device for the first virtual object, wherein the rendering of the first virtual object in accordance with the first characteristic is further responsive to the receiving of the first request.

\* \* \* \* \*